Dec. 24, 1940.    G. W. WATSON    2,226,036
ELECTRIC APPARATUS FOR PREPARING FOOD
Filed Aug. 22, 1938    2 Sheets-Sheet 1
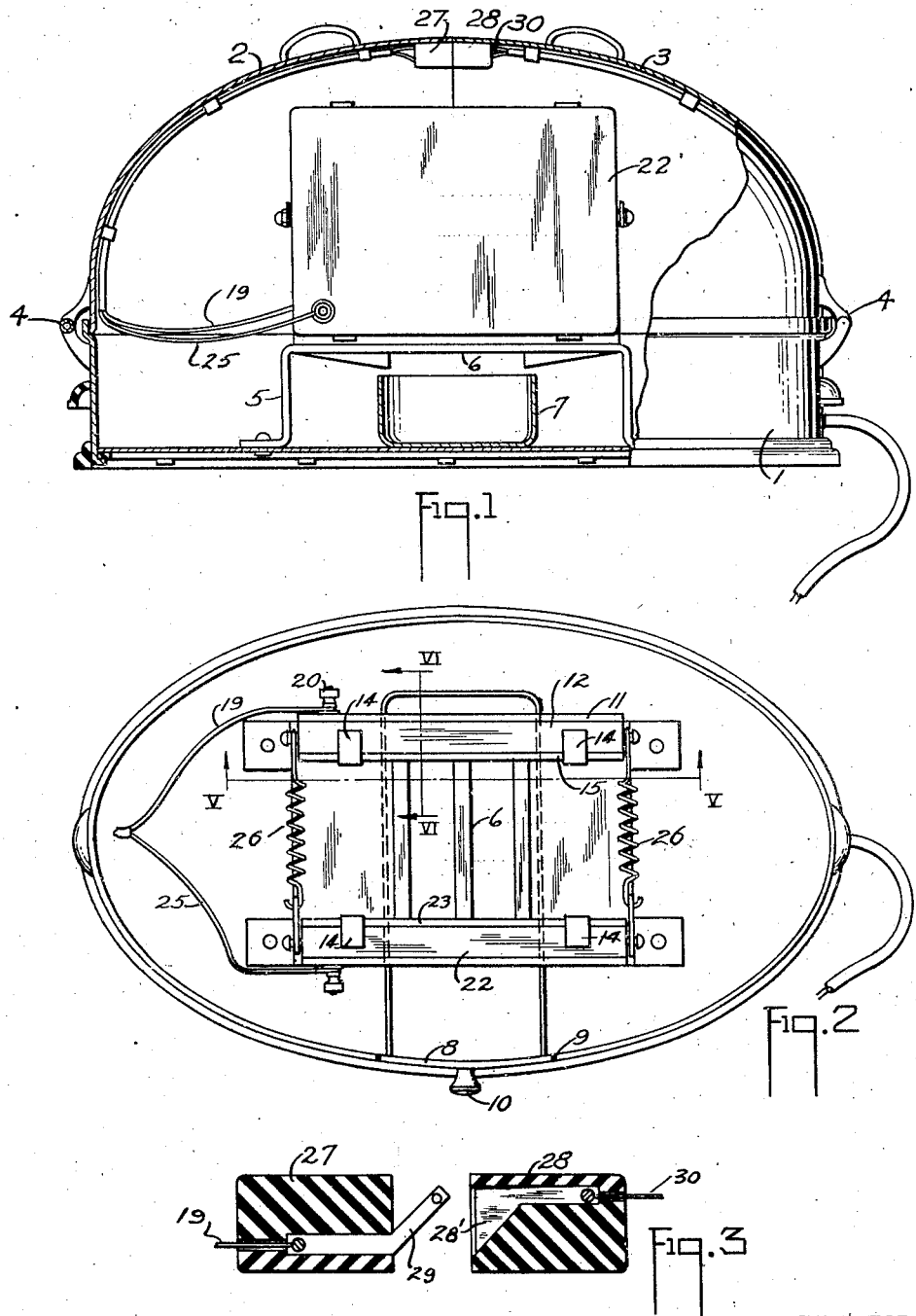
INVENTOR.
GLENN W. WATSON.
BY Samuel Weisman
ATTORNEY.

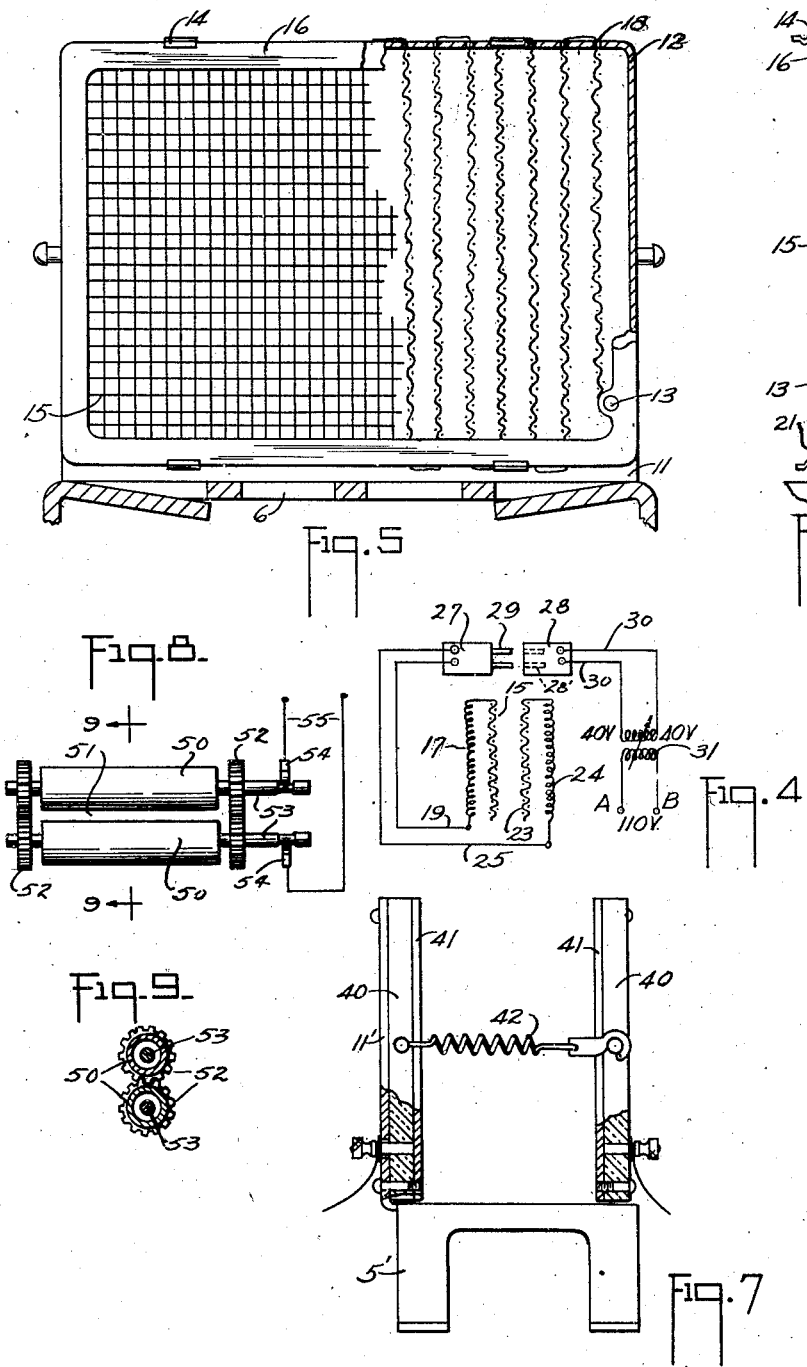

Patented Dec. 24, 1940

2,226,036

UNITED STATES PATENT OFFICE 2,226,036

ELECTRIC APPARATUS FOR PREPARING FOOD

Glenn W. Watson, Detroit, Mich., assignor to Penweld Corporation, Detroit, Mich., a corporation of Michigan Application August 22, 1938, Serial No. 226,035

3 Claims. (Cl. 219—19)

The present invention pertains to a novel apparatus for preparing food by the use of an electric current. The general objects are similar to those described in the co-pending application of Watson and Brannas, Serial No. 213,197, filed July 11, 1938. A more specific object is to provide an apparatus whereby the food is well cooked in the center as well as on the surfaces. This object is accomplished by applying to the food two distinct heat treatments, one affecting the interior of the food and the other affecting more particularly the surfaces.

One example of the usefulness and desirability of the invention occurs in the preparation of steaks. According to ordinary methods of cooking, if the surface of the steak is attractively browned, the interior is rare. On the other hand, if the steak is cooked sufficiently to cook the interior more thoroughly, the surfaces become excessively browned and give the impression that the steak is burned.

The present invention overcomes this difficulty by passing a current through the food to cook the interior and providing heat radiating means for browning the surfaces, this means being operated by the same electric circuit that passes through the food.

In one embodiment of the invention, the radiated heat is produced by an electric element adjacent to both surfaces of the food and of such character that, on passage of current therethrough, it rises to a temperature suitable for the desired heat-browning effect. These elements may consist, for example, of the alloys commonly used in electric toasters, one of which is sold under the name of "Chromel."

In another embodiment of the invention, a single member on each surface serves both purposes of carrying current to the food and radiating heat for the heat-browning effect. It will be understood, of course, that at least two such elements are brought into contact with the food in order to pass current through the food. This element may also consist of an alloy of the character described above, or of a material containing a comparatively large amount of carbon. In other words, the important characteristic of this material is that it be of such resistance as to generate sufficient heat to brown the food when a current is passed through it.

The invention is fully disclosed by way of example in the following description and in the accompanying drawings in which:

Figure 1 is a longitudinal vertical section of the device;

Figure 2 is a plan view, with the cover removed;

Figure 3 is a detail of the switch;

Figure 4 is a wiring diagram;

Figure 5 is a section on the line 5—5 of Figure 1, and partly broken away;

Figure 6 is a section on the line 6—6 of Figure 2;

Figure 7 is a detail section of a modified construction;

Figure 8 is an elevation of another modification, and

Figure 9 is a cross section thereof.

Reference to these views will now be made by use of like characters which are employed to designate corresponding parts throughout.

In Figures 1 and 2, the device is illustrated as comprising a base 1 on which is mounted a split cover, comprising sections 2 and 3 hinged to the base at 4. The base is hollow and has fixed therein, approximately at its center, a stand or bridge 5 having a grill top 6, as may be seen more clearly in Figure 2. A pan or drawer 7 is slidably received beneath the stand or bridge to receive the gravy or drippings from the food as will presently be described. The member 7 carries with it a section 8 constituting a portion of the lateral wall of the member 1 and covering an opening 9 in said wall. The pan 7 is pulled out by a handle 10.

A bracket 11 is extended upwardly from the bridge 5, as shown in Figure 6. To the bracket is welded a frame 12. To the inner surface of the frame, that is, the surface nearer the food, is secured a conductor which may be in the form of a screen 15 held by a narrow frame 16 secured by spring clips 14. Within the frame and outward of the conductor 15 is mounted a heat-radiating element 17 which may be in the form of toaster wire threaded through openings 18 in the sides of the frame 12, as may be seen in Figure 5. A conductor 19 from a source of current is fastened to the element 17 by any suitable means 20, and the element is connected in series with the conductor 15 by a short conductor 21 and wing nut 13, as illustrated in Figure 6.

A similar unit, facing that previously described, is loosely mounted on the bridge 5 and comprises a frame 22, similar to the frame 12, carrying a conducting member 23 for engaging the food and behind it a radiating element 24, as shown in the diagram and in the manner described in connection with Figures 5 and 6. The other side 25 of the line is suitably connected to the element 24.

The conductors 15 and 23 face each other to engage the food inserted between the two units. The last described unit is drawn towards the fixed unit by two or more springs 26 extending from the frame 12 and suitably fastened to the frame 22.

The conductors 19 and 25 are extended along the inner surface of the cover section 2 and terminate in a two-prong plug 27 at the free or swinging edge of the section. The abutting edge of the cover section 3 carries a corresponding two-hole socket 28 adapted to enter the socket 27 when the sections are closed. The prongs 29 of the plug are set at the proper angle to permit the necessary swinging movement as the cover sections are brought together, the socket holes 28' being shaped accordingly. Conductors 30 extend from the holes of socket 28 to a source of current, and a variable transformer 31 is inserted in these conductors. The transformer is adapted to reduce the voltage from 110 to approximately 40 volts, or in any other ratio according to the current characteristics, the construction of the apparatus or the requirements in any particular case. It will be evident from the described construction of the switch 27, 28 that the user cannot receive an electric shock since there is no current flowing until the cover is closed and the user cannot then touch the active parts of the apparatus.

In the modification shown in Figure 7, each of the units consists of an insulated backing member 40 of ceramic material, porcelain or the like, carrying a conducting and heat-radiating element 41 adapted to engage the surface of the food. One of the units is fastened to a bracket 11' extending from the bridge 5', while the other unit is loose and resiliently connected to the fixed unit by spring devices 42 in the manner described in connection with preceding figures.

The members 41 engage opposite surfaces of the food and cause the current to pass therethrough. They have the additional property of developing and radiating sufficient heat to brown the surfaces that they engage. In this respect, each member 41 performs the functions of the food-engaging conductor and the radiating element in the units shown in Figures 5 and 6.

Various materials may be employed to constitute the members 41. One type of such material is the alloys used for making the elements of electric toasters, but embodied in rather thin sheet form herein. One of such alloys is available on the market under the name "Chromel."

Another material having the desired properties is hard pressed sheet carbon or a composition of high carbon content, one of which is known on the market as "Globar." These elements being in contact with the food, radiate heat satisfactorily through the food without reflectors, but in the construction shown in Figures 5 and 6 it is preferred to form the inner surfaces of the frames with a reflecting coating at the area indicated by the numeral 43 in Figure 6.

In the operation of the device, with the circuit closed at the switch 27, 28, the food to be prepared stands on the grill 6, and current flows through the food between conductors 15 and 23. At the same time, the members 17 and 24 in the circuit radiate heat and brown the adjacent surfaces of the food, as already indicated. The juices liberated from the food during the cooking drain into the pan 7.

In the event that the circuit is left closed too long for any reason, the browning of the surfaces and the elimination of the juices by drainage and evaporation gradually increases the electrical resistance of the meat. The quantity of current flowing therethrough also diminishes in like degree and, in fact, is nearly zero by the time the food is properly cooked. Thus, in case of an oversight, no serious damage can be done either to the food or to the apparatus. This action is similar to that of an automatic switch.

In the modification shown in Figures 8 and 9, the members for conducting current to the food and radiating heat for browning the food are in the form of a pair of spaced parallel rollers 50 consisting of any of the materials described above, having the property of conducting current to the food and generating sufficient heat to brown the food by radiation. The rollers are preferably hollow.

The rollers 50 are spaced apart at 51 sufficiently to permit the food, such as a slice of meat, to be rolled therebetween, in the mode of operation of a clothes ringer.

The rollers are provided at one or both ends with meshing gears 52 fixed on shafts 53. Power applied to one of the shafts obviously turns both rollers.

To the shafts 53 of both rollers are applied suitable contact brushes 54. Conductors 55 are extended from the brushes to the source of current, as illustrated in Figure 8.

Although specific embodiments of the invention have been illustrated and described, it will be understood that various alterations in the details of construction may be made without departing from the scope of the invention, as indicated by the appended claims.

What I claim is:

1. In an apparatus for preparing food by heat treatment, a pair of units connected to opposite sides of a circuit, thereby including the food as a resistant and a conductor in said circuit, each unit including a perforate conducting member adapted to engage a surface of the food, and a heat-radiating resistance in series with and spaced slightly behind said member, in said radiating resistances being of such resistance as to radiate sufficient heat, on flow of current therethrough, to brown said surfaces.

2. In an apparatus for preparing food by heat treatment, a pair of relatively movable conducting members adapted to engage two surfaces of the food and to convey the food between them, said members being connected to opposite sides of a circuit, thereby including the food as a resistance and a conductor in said circuit, and means for moving said members relatively to food therebetween.

3. In an apparatus for preparing food by heat treatment, a pair of relatively movable conducting members adapted to engage two surfaces of the food and to convey the food between them, said members being connected to opposite sides of a circuit, thereby including the food as a resistance and a conductor in said circuit, said members comprising a material adapted to radiate sufficient heat on flow of current therethrough, to brown said surfaces, and means for moving said members relatively to food therebetween.

GLENN W. WATSON.

CERTIFICATE OF CORRECTION.

Patent No. 2,226,036. December 24, 1940.

GLENN W. WATSON.

It is hereby certified that error appears in the printed specification of the above numbered patent requiring correction as follows: Page 2, second column, line 47, claim 1, strike out the word "in"; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.